US009383428B2

(12) United States Patent
Green et al.

(10) Patent No.: US 9,383,428 B2
(45) Date of Patent: Jul. 5, 2016

(54) PASSIVE ACOUSTIC BEARING ESTIMATION VIA ULTRA SHORT BASELINE WIDEBAND METHODS

(71) Applicant: Teledyne Instruments, Inc., Thousand Oaks, CA (US)

(72) Inventors: Maurice D. Green, North Falmouth, MA (US); Steven J. McManus, Marion, MA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 582 days.

(21) Appl. No.: 13/795,500

(22) Filed: Mar. 12, 2013

(65) Prior Publication Data

US 2014/0269200 A1    Sep. 18, 2014

(51) Int. Cl.
*G01S 3/808*    (2006.01)
*G01S 5/20*    (2006.01)
*G01S 5/00*    (2006.01)

(52) U.S. Cl.
CPC ............... *G01S 3/808* (2013.01); *G01S 3/8083* (2013.01); *G01S 5/20* (2013.01); *G01S 5/0036* (2013.01)

(58) Field of Classification Search
CPC ......... G01S 3/8083; G01S 3/808; G01S 5/20; G01S 5/0036
See application file for complete search history.

(56) References Cited

U.S. PATENT DOCUMENTS

| 3,461,421 | A | * | 8/1969 | Stover | G01S 5/0009 367/124 |
|---|---|---|---|---|---|
| 3,879,701 | A | | 4/1975 | Stagg | |
| 4,198,704 | A | | 4/1980 | Munson | |
| 4,454,597 | A | * | 6/1984 | Sullivan | G10K 11/346 367/12 |
| 4,480,322 | A | | 10/1984 | Orieux et al. | |
| 5,095,467 | A | | 3/1992 | Olson et al. | |
| 6,262,944 | B1 | | 7/2001 | Meyer et al. | |
| 6,700,832 | B2 | | 3/2004 | Yang | |
| 7,362,653 | B2 | | 4/2008 | Green et al. | |
| 8,111,585 | B1 | | 2/2012 | Graber | |
| 8,995,229 | B2 | | 3/2015 | Melvin, II et al. | |
| 2003/0231547 | A1 | | 12/2003 | Yang | |
| 2014/0269200 | A1 | * | 9/2014 | Green | G01S 3/8083 367/129 |

FOREIGN PATENT DOCUMENTS

JP    4-160382 A    6/1992

OTHER PUBLICATIONS

Duckworth et al.; Fixed and wearable acoustic counter-sniper systems for law enforcement; Nov. 1998, pp. 1-22.*
International Search Report and Written Opinion for International Application No. PCT/US2014/021977 mailed Aug. 1, 2014.
International Preliminary Report on Patentability for International Application No. PCT/US2014/021977 issued Sep. 15, 2015.
Datta et al., "Bearing estimation using small tetrahedral passive hydrophorie array", Oceans 2010, IEEE, Piscataway, NJ, USA, Sep. 20, 2010, pp. 1-8.

* cited by examiner

*Primary Examiner* — Daniel Pihulic
(74) *Attorney, Agent, or Firm* — K&L Gates LLP

(57) ABSTRACT

In various embodiments, a passive bearing detector is disclosed. The passive bearing detector comprises a plurality of hydrophones. The plurality of hydrophones is arranged in a three-dimensional geometry. The three-dimensional geometry exposes each of the plurality of hydrophones to an ambient aquatic acoustic environment. The passive bearing detector further comprises a processor electrically coupled to the plurality of hydrophones. The processor is configured to determine a direction of arrival of an unknown broadband acoustic signal received by the plurality of hydrophones based on the phase difference of the unknown broadband acoustic signal at each of the plurality of hydrophones.

17 Claims, 9 Drawing Sheets

PASSIVE ACOUSTIC BEARING ESTIMATION VIA ULTRA SHORT BASELINE WIDEBAND METHODS

BACKGROUND

Locating and tracking surface, near-surface, and underwater platforms continues to be a concern of government and private organizations. Traditional methods of sea-going platform tracking rely on active signals or known information about a received signal. For example, sonar tracking relies on an active signal sent from a known location. The active signal is reflected off one or more sea-going platforms, such as a ship, and returned to the source of the active signal. Although sonar tracking provides accurate location information, sonar tracking relies on an active pulse that can be easily detected by sea-going platforms and which provides location information on the signal source.

Ultra-short baseline (USBL) positioning allows underwater acoustic positioning for known acoustic signals. A transceiver is mounted on ship and transmits a known signal. The known signal is received by a remote device, such as an underwater remotely-operated vehicle (ROV). The remote device responds with a return signal which is detected by the transceiver on the ship. The return time and the return angle are calculated for the received signal and the position of the remote device determined. Traditional USBL requires a known signal transmitted from a known location. U.S. Pat. No. 7,362,653, issued on Apr. 22, 2008, and entitled "Underwater Geopositioning Methods and Apparatus" is incorporated herein by reference in its entirety. Because a known signal must be sent and received, USBL does not provide tracking capabilities for unknown signals or uncooperative sea-going platforms.

What is needed is a system for passively tracking sea-going platforms based on unknown broadband acoustic signals generated by the sea-going platform.

SUMMARY

In various embodiments, a passive bearing detector is disclosed. The passive bearing detector comprises a plurality of hydrophones. The plurality of hydrophones are arranged in a three-dimensional geometry. The three-dimensional geometry exposes each of the plurality of hydrophones to an ambient aquatic acoustic environment. The passive bearing detector further comprises a processor electrically coupled to the plurality of hydrophones. The processor is configured to determine at least one direction of arrival of an unknown broadband acoustic signal received by the plurality of hydrophones based on the phase difference of the unknown broadband acoustic signal at each of the plurality of hydrophones.

In various embodiments, a method for passive bearing tracking of sea-going platforms is disclosed. The method comprises arranging a plurality of hydrophones in a three-dimensional geometry configured to expose each of the plurality of hydrophones to an aquatic ambient acoustic environment. The method further comprises receiving an unknown broadband acoustic signal at a plurality of hydrophones. A processor calculates at least one direction of arrival of the unknown broadband acoustic signal. The calculation is based on a phase difference of the unknown broadband acoustic signal received by the plurality of hydrophones.

In various embodiments, an apparatus for passive direction of arrival estimation of sea-going platforms is disclosed. The apparatus comprises a plurality of hydrophones arranged in a three-dimensional geometry configured to expose each of the plurality of hydrophones to an ambient aquatic acoustic environment. The apparatus further comprises a processor electrically coupled to the plurality of hydrophones and a memory unit coupled to the processor. The memory unit is configured to store a plurality of instructions. When loaded by the processor, the instructions control the processor to determine at least one direction of arrival of an unknown broadband acoustic signal received by the plurality of hydrophones. The determination is based on a phase difference of the unknown broadband acoustic signal received by the plurality of hydrophones.

DRAWINGS

The features of the various embodiments are set forth with particularity in the appended claims. The various embodiments, however, both as to organization and methods of operation, together with advantages thereof, may best be understood by reference to the following description, taken in conjunction with the accompanying drawings as follows:

DESCRIPTION

In various embodiments, a passive bearing detector is disclosed. The passive bearing detector comprises a plurality of hydrophones. The plurality of hydrophones are arranged in a three-dimensional geometry. The three-dimensional geometry exposes each of the plurality of hydrophones to an ambient aquatic acoustic environment. The passive bearing detector further comprises a processor electrically coupled to the plurality of hydrophones. The processor is configured to determine at least one direction of arrival of an unknown broadband acoustic signal received by the plurality of hydrophones based on the phase difference of the unknown broadband acoustic signal at each of the plurality of hydrophones.

In various embodiments, a method for passive bearing tracking of sea-going platforms is disclosed. The method comprises arranging a plurality of hydrophones in a three-dimensional geometry configured to expose each of the plurality of hydrophones to an aquatic ambient acoustic environment. The method further comprises receiving an unknown broadband acoustic signal at a plurality of hydrophones. A processor calculates at least one direction of arrival of the unknown broadband acoustic signal. The calculation is based on a phase difference of the unknown broadband acoustic signal received by the plurality of hydrophones.

In various embodiments, an apparatus for passive direction of arrival estimation of sea-going platforms is disclosed. The apparatus comprises a plurality of hydrophones arranged in a three-dimensional geometry configured to expose each of the plurality of hydrophones to an ambient aquatic acoustic environment. The apparatus further comprises a processor electrically coupled to the plurality of hydrophones and a memory unit coupled to the processor. The memory unit is configured to store a plurality of instructions. When loaded by the processor, the instructions control the processor to determine at least one direction of arrival of an unknown broadband acoustic signal received by the plurality of hydrophones. The determination is based on a phase difference of the unknown broadband acoustic signal received by the plurality of hydrophones.

Reference will now be made in detail to several embodiments, including embodiments showing example implementations of systems and methods for passive acoustic bearing estimation. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

Figure 1:
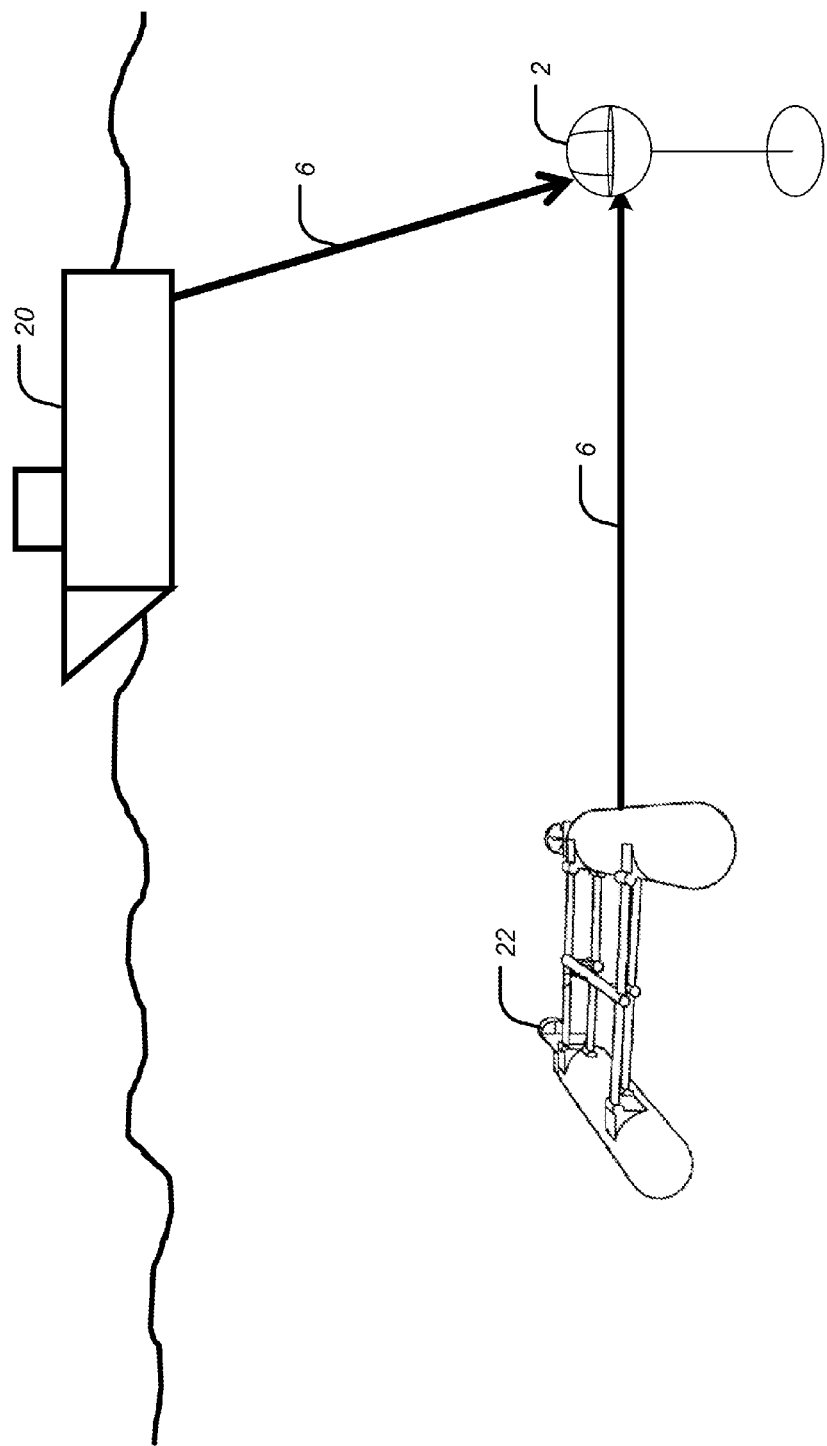
FIG. 1 illustrates one embodiment of a passive bearing detector.

FIG. 1 illustrates one embodiment of a passive bearing detector 2. The passive bearing detector 2 comprises a plurality of hydrophones configured to receive an arbitrary, random, or otherwise unknown underwater broadband acoustic signal 6. The broadband acoustic signal 6 may be generated by a sea going platform, such as, for example, a passing ship 20, an underwater autonomous vehicle 22, or other sea-going platform. The sea-going platform 20, 22 may passively radiate the unknown broadband acoustic signal 6 or may actively transmit the unknown broadband acoustic signal 6. The unknown broadband acoustic signal 6 may be received by the passive bearing detector 2 without any foreknowledge of the source of the unknown broadband acoustic signal 6. The passive bearing detector 2 may be configured to determine at least one direction of arrival for the received unknown broadband acoustic signal 6. In some embodiments, an azimuthal direction of arrival and a vertical direction of arrival may be determined by the passive bearing detector 2. Those skilled in the art may recognize that any number of suitable directions of arrival may be calculated.

Figure 2:
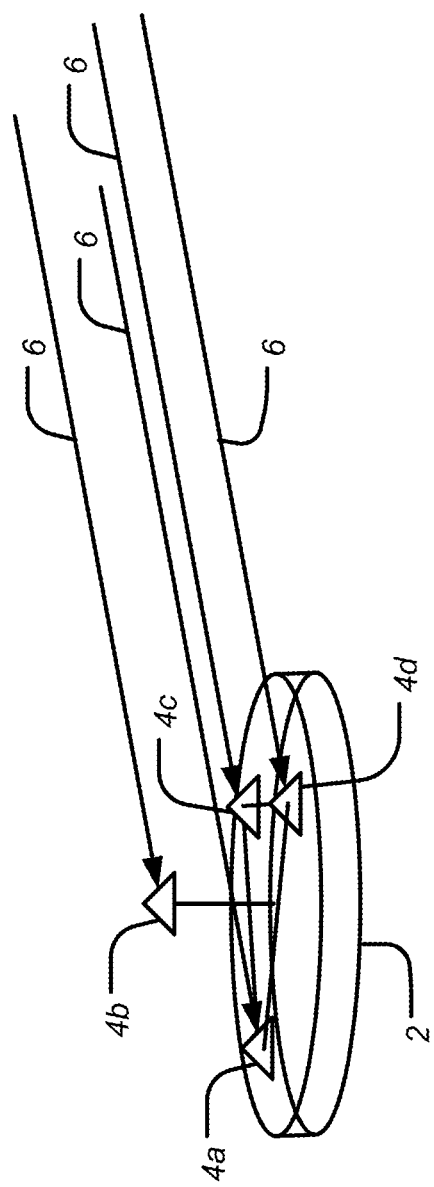
FIG. 2 illustrates one embodiment of a three-dimensional geometric arrangement of hydrophones in a passive bearing detector.

FIG. 2 illustrates one embodiment of the plurality of hydrophones. The plurality of hydrophones 4a-4d may be arranged in a three-dimensional geometry to allow each of the plurality of hydrophones 4a-4d to receive the unknown broadband acoustic signal 6. The plurality of hydrophones 4a-4d may be equally spaced or arbitrarily spaced within the three-dimensional geometry. In the embodiment shown in FIG. 2, the plurality of hydrophones 4a-4d are arranged in a tetrahedral configuration. Those skilled in the art will recognize that any suitable geometric arrangement and spacing may be employed based on the number of hydrophones present in the passive bearing detector 2. The geometric arrangement allows each of the hydrophones 4a-4d to receive the unknown broadband acoustic signal 6. Each hydrophone 4a-4d may receive the broadband acoustic signal 6 at a different phase. The passive bearing detector 2 may utilize the phase difference between the plurality of hydrophones 4a-4d to calculate the at least one direction of arrival for the unknown broadband acoustic signal 6.

Figure 3:
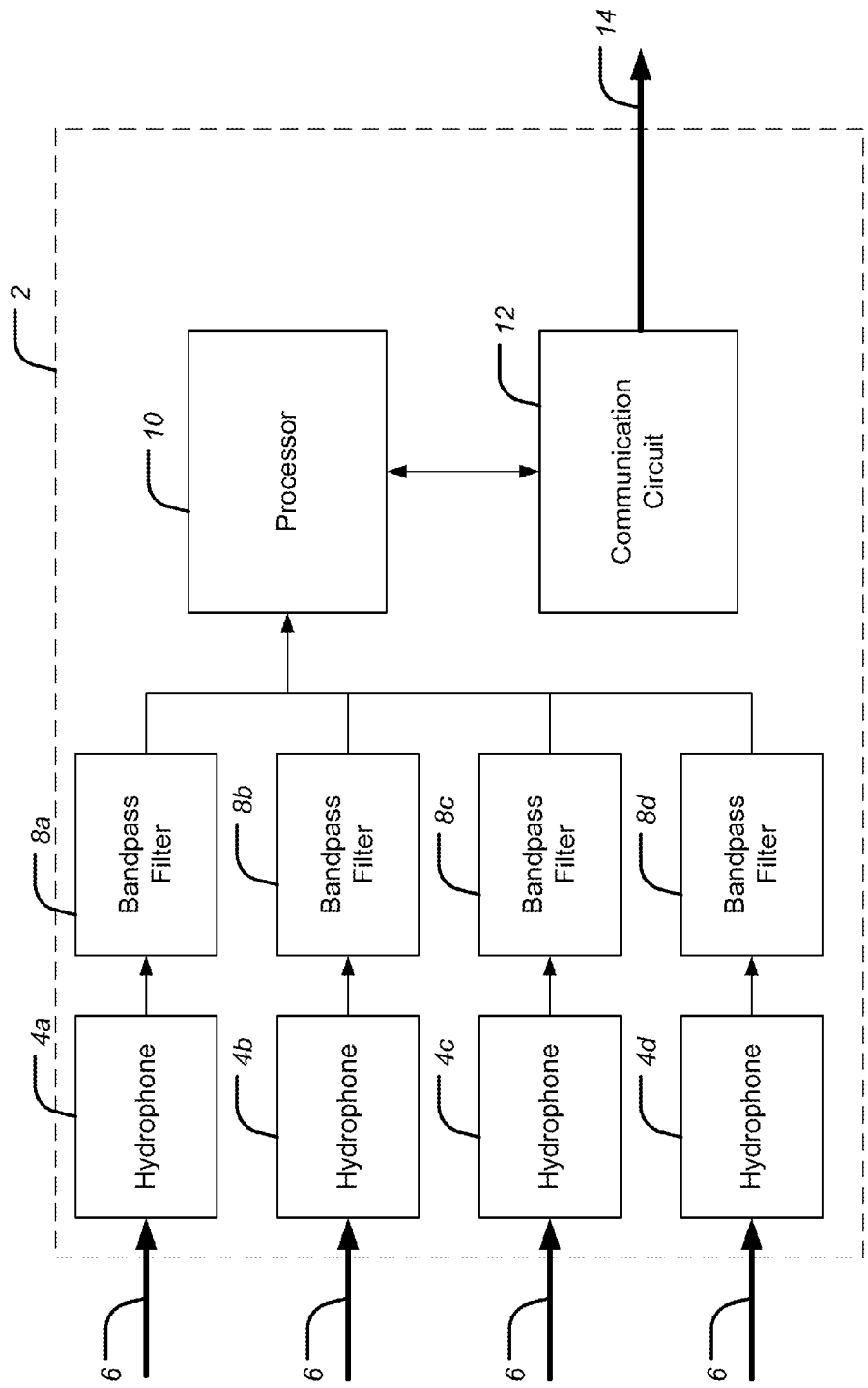
FIG. 3 illustrates a block-diagram of one embodiment of a passive bearing detector.

FIG. 3 illustrates one embodiment of a block-diagram of the passive bearing detector 2 shown in FIGS. 1 and 2. In some embodiments, the plurality of hydrophones 4a-4d may be configured to receive an unknown broadband acoustic signal 6. The unknown broadband acoustic signal 6 may be processed through individual bandpass filters 8a-8d associated with each of the individual hydrophones 4a-4d. The bandpass filters 8a-8d may be electrically coupled to a processor 10. In some embodiments, the processor 10 may be configured to calculate one or more directions of arrival for the unknown broadband acoustic signal 6. The processor 10 may calculate the one or more directions of arrival for the unknown broadband acoustic signal 6 based on the phase difference between the unknown broadband acoustic signal 6 received at each of the hydrophones 4a-4d.

In some embodiments, the passive bearing detector 2 may comprise a transmitter 12. The one or more directions of arrival (or other measurements performed on the unknown broadband acoustic signal 6) may be transmitted to a remote device or entity capable of acting on the direction of arrival information. The processor 10 may be configured to generate a message 14 indicative of the one or more directions of arrival calculated for the unknown broadband acoustic signal 6. The message 14 may be provided to the transmitter 12 for transmission to a remote device. The remote device may comprise, for example, one or more additional passive bearing detectors, a communication buoy, a sea-based platform, one or more undersea or near-surface sensors, a land-based monitoring station, or any other suitable remote device. In some embodiments, the transmitter 12 may be configured as an acoustic transmitter and may transmit the message using one or more acoustic signals. In some embodiments, the transmitter 12 may be configured as a transceiver configured to transmit and receive acoustic signals. For example, the transmitter 12 may comprise an acoustic modem. In some embodiments, the transmitter 12 may comprise the same signal acquisition structure and signal processing structure as the direction of arrival calculation. For example, in one embodiment, the plurality of hydrophones 4a-4d may be configured to receive an unknown broadband signal 6 and may also be configured as an acoustic modem for transmitting or receiving one or more messages 14 comprising the at least one direction of arrival. In some embodiments, the transmitter 12 may transmit the message 14 as an acoustic signal to an acoustic receiver, such as, for example, an acoustic modem, connected to a communication buoy. The communication buoy may be configured to transmit the received message 14 to a remote location, such as, for example, a land-based or ship-based monitoring station.

Figure 4:
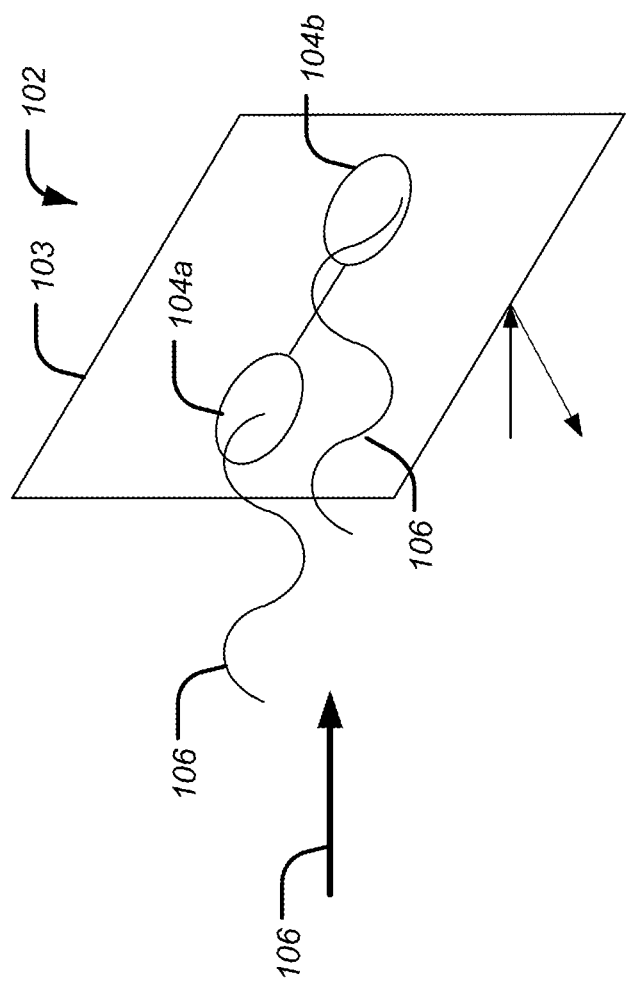
FIG. 4 illustrates one embodiment of a two-hydrophone passive bearing detector.
Figure 5:
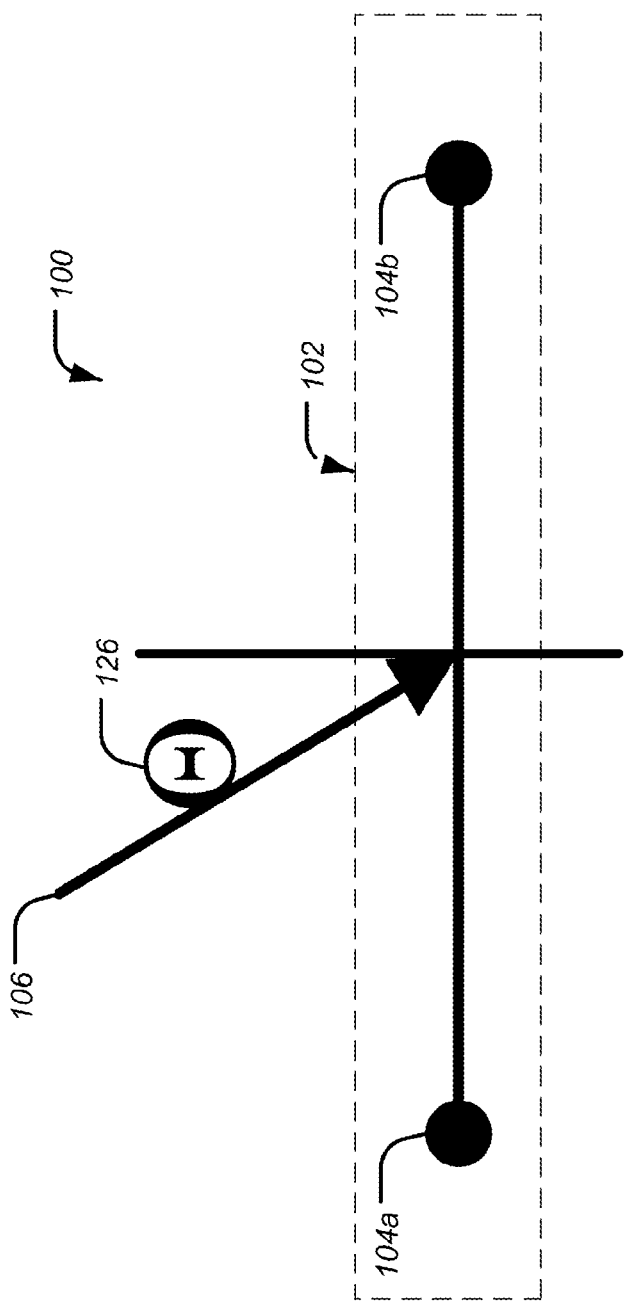
FIG. 5 illustrates one embodiment of a planar representation of a two hydrophone passive bearing detector.

FIG. 4 illustrates one embodiment of a two-hydrophone passive bearing detector 102. The passive bearing detector 102 may comprise a first hydrophone 104a and a second hydrophone 104b. The first hydrophone 104a and the second hydrophone 104b may be formed on a backing 103. The backing may support the first hydrophone 104a and the second hydrophone 104b in a linear arrangement. FIG. 5 illustrates one embodiment of a planar representation 100 of the two-hydrophone passive bearing detector 102. As can be seen in both FIGS. 4 and 5, the unknown broadband acoustic signal 106 is received at the passive bearing detector 102 from a reference angle Θ 126.

Figure 6:
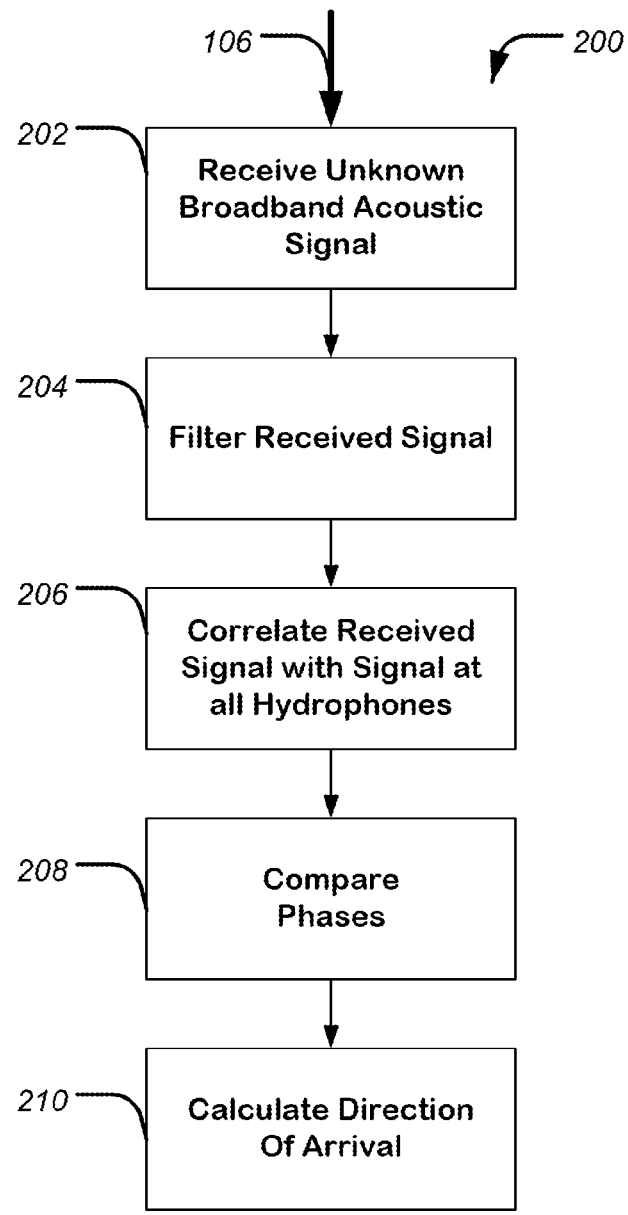
FIG. 6 illustrates one embodiment of a process for determining a direction of arrival for an unknown broadband acoustic signal.

FIG. 6 illustrates one embodiment of a process 200 for determining a direction of arrival of unknown broadband acoustic signal 106 received by the passive bearing detector, such as, for example, the passive bearing detector 102. Although the process 200 for determining direction of arrival of an unknown broadband acoustic signal is discussed with respect to the passive bearing detector 102, those skilled in the art will recognize that the process may be applied by any passive bearing detector comprising any number of hydrophones, such as, for example, the passive bearing detector 2 shown in FIGS. 1-3. The direction of arrival of the broadband acoustic signal 106 may be determined based on the phase difference of the broadband acoustic signal 106 received at each of the plurality of hydrophones 104a-104b. A temporally-restricted second order function may be utilized to derive a phase measurement from the broadband acoustic signal 6 received at each of the plurality of hydrophones 104a-104b.

An unknown broadband acoustic signal 106 may be received at a reference hydrophone comprising one of the plurality of hydrophones, such as, for example, the first hydrophone 104a. In some embodiments, the unknown broadband acoustic signal 106, r(t), may be represented by the equation:

$$r(t) = X(t)e^{j2\pi F_c t} + \text{noise} \quad (1)$$

wherein $X(t)$ is the complex envelope of the signal and $F_c$ is the center frequency of the broadband acoustic signal 106. In some embodiments, the noise is assumed to be independent of the broadband acoustic signal 106 and the noise bandwidth is assumed to be the same as the signal bandwidth. The broadband acoustic signal 106 arrives at all of the N hydrophones in the plurality of hydrophones from an angle θ 126 relative to a reference angle. In some embodiments, the passive bearing detector comprises at least two hydrophones 104a, 104b. In some embodiments, three or more hydrophones, such as, for example, the four hydrophone arrangement shown in FIG. 2, may be employed to eliminate forward-backward and up-down ambiguities that may arise in a two hydrophone passive bearing detector 102.

The unknown broadband acoustic signal 106 may be received 202 by each of the plurality of hydrophones 104a, 104b and may be filtered 204 through individual bandpass filters associated with each of the plurality of hydrophones 104a, 104b. In some embodiments, an autocorrelation $R_{11}(\tau)$ at the first hydrophone 104a and a cross-correlation $R_{12}(\tau)$ between the first hydrophone 104a and the second hydrophone 104b is performed 106. The autocorrelation $R_{11}(\tau)$ and the cross-correlation $R_{12}(\tau)$ are used to determine the approximate arrival time from the correlator output $R_1(\tau)$. The correlations may be calculated according to the equation:

$$R_{1k}(\tau) = \frac{1}{T} \int_{\tau-T/2}^{\tau+T/2} [X_1(t+\tau)e^{-j2\pi F_c(t+\tau)} + \text{noise}_1^*(t+\tau)]$$

$$[X_k(t)e^{j2\pi F_c t} + \text{noise}_k(t)]dt$$

$$k = 1, 2 \quad (2)$$

wherein T is the arbitrary signal duration. As the plurality of hydrophones 104a, 104b are physically close relative to the half wavelength at the signal center frequency, the autocorrelation $R_{11}(\tau)$ and the cross-correlation $R_{12}(\tau)$ may be considered essentially the same function, with the exception of the presence of noise and a slight variation in phase as discussed in more detail blow. Assuming that WT>>1, wherein W is the signal bandwidth, it can be shown that:

$$R_1(\tau) \approx R_X(\tau) + R_N(\tau) \quad (3)$$

$$R_{1k}(\tau) \approx \exp(-i2\pi F_c(\tau+L))R_X(\tau+L) + R_{N1k}(\tau+L) \quad (4)$$

wherein $R_{N1k}$ reflects the correlation between the noise at the two receiving hydrophones. In one embodiment, as identified in equation (4), a low noise or strong signal to noise ratio (SNR) is required. Because a low noise or strong SNR is assumed, the noise term ($R_{N1k}$) may be dropped from equation (4).

In some embodiments, the peak of $|R_1(\tau)|$ is found. The lag time of the system, τ, is set 14 to τ=0 at the peak of $|R_1(\tau)|$. At τ=0, the relationship between the correlation $R_{1k}$ and $R_{12}$ may be reduced to:

$$R_{1k}(\tau) \approx R_{12}(L) \approx (\text{constant}) \cdot e^{-j2\pi F_c L} \quad (5)$$

Figure 7:
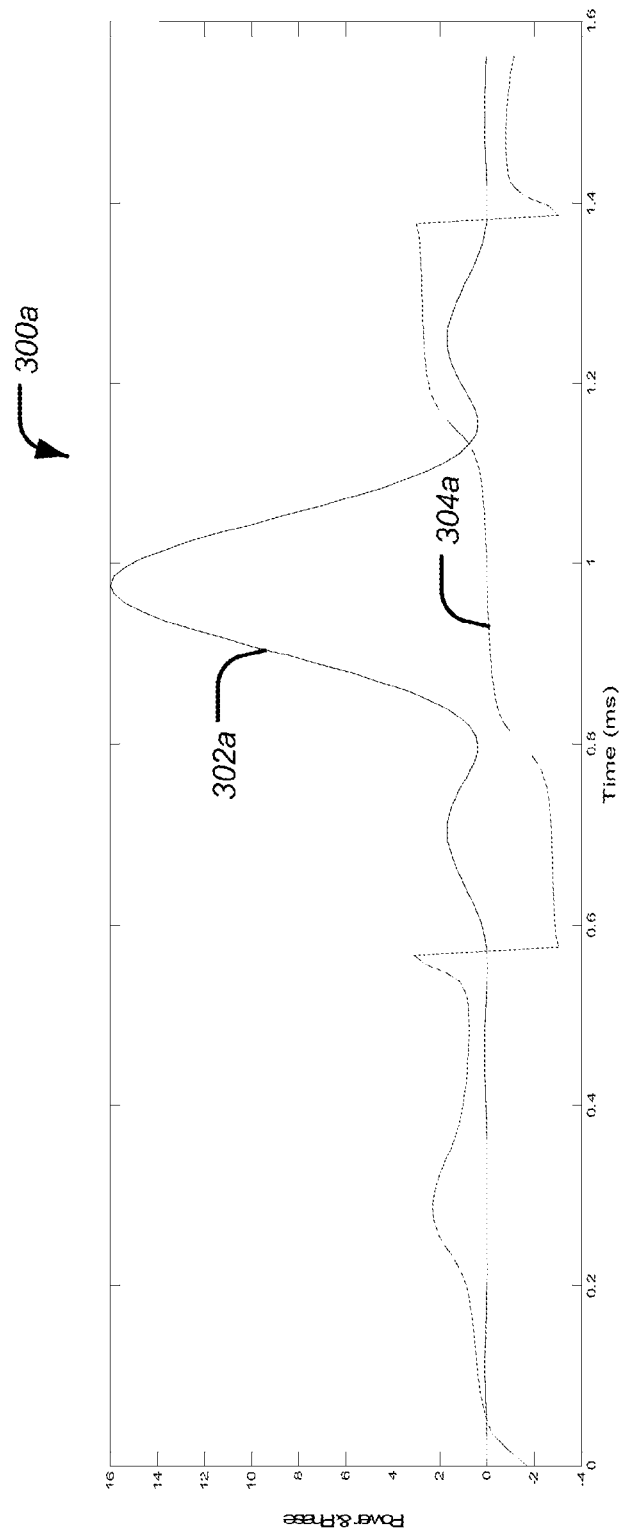
FIG. 7 illustrates one embodiment of a phase of an unknown broadband acoustic signal compared to an autocorrelation of the unknown broadband acoustic signal.

FIG. 7 illustrates one embodiment of a plot 300a of a phase 304a of an unknown broadband acoustic signal 6 plotted relative to the autocorrelation function 302a of the unknown broadband acoustic signal. As can be seen in FIG. 7, the phase 304a is nearly constant under the main lobe of the autocorrelation function 302a. Because the phase 304a is nearly constant, those skilled in the art will recognize that the assumptions of equation (5) are justified in broadband acoustic signals, such as the unknown broadband acoustic signal 106.

With reference again to FIGS. 4 and 5, The phase of $R_1(0)$ and $R_2(L)$ can be compared 108. Let $D = R^*_{11}(0)R_{12}(L)$ and note that $R_{11}(0) \approx 1$ (real). The phase angle between the two complex correlations is:

$$\Phi = \arctan(\text{imag}(D), \text{real}(D)) \quad (6)$$

wherein the arc tangent is the 4-quadrant version of its arguments. But in the vicinity of the peak, which is assumed to be nearly constant, $D = e^{-j2\pi F_c L}$, therefore $$\Phi = 2\pi F_c L \quad (7)$$

$$\Phi = 2\pi F_c \left(\frac{d}{c}\right)\cos(\Theta) \quad (8)$$

wherein c is the sonic speed (which is assumed known) and d is the spacing between the reference hydrophone and each of the remaining hydrophones. Therefore, the desired direction of arrival, θ, for the unknown broadband signal may be calculated 210 using the relationship:

$$\Theta = \cos^{-1}\left(\frac{\lambda\Phi}{2\pi d}\right) \quad (9)$$

wherein $\lambda = c/F_c$ is the wavelength at the upper band edge frequency.

The requirement that $|R(\tau)|$ be a constant value is equivalent to the requirement that 1/W>d/c which means that W<c/d. For example, if W=5 kHz and c=1500 m/s, then the spacing between the plurality of hydrophones 104a, 104b in the passive bearing detector is constrained to d<30 cm. However, in some embodiments, a tighter restriction requiring d<λ/2 may be imposed. Assuming this restriction, for $F_c$=11,000 Hz, the maximum spacing between the plurality of hydrophones 104a, 104b may be approximately 6.5 cm. In some embodiments, the passive bearing detector 102 may comprise three or more hydrophones 4a-4d. The phase estimates for each of the plurality of hydrophones 4a-4d may be compared 112 to produce a three dimensional (3D), unambiguous estimate of the vertical and horizontal directions of arrival for the unknown broadband acoustic signal 106.

Figure 8A:
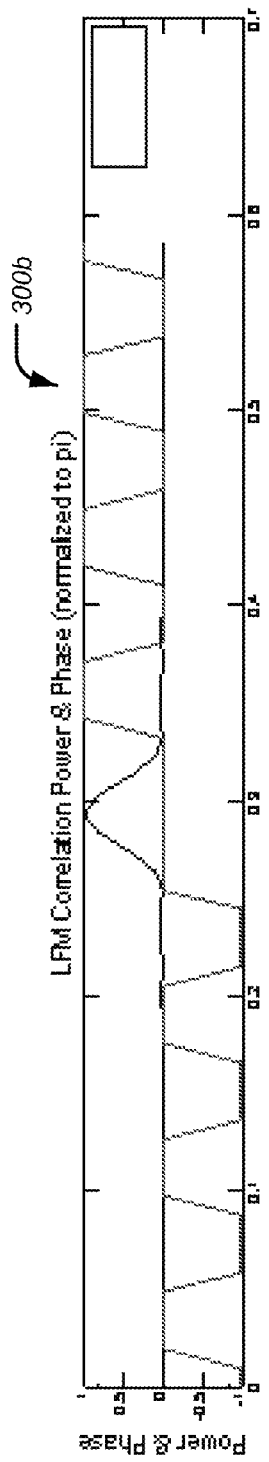
FIG. 8A illustrates one embodiment of a phase of a linear frequency modulated chirp signal compared to an autocorrelation of the linear frequency modulated chirp signal.
Figure 8B:
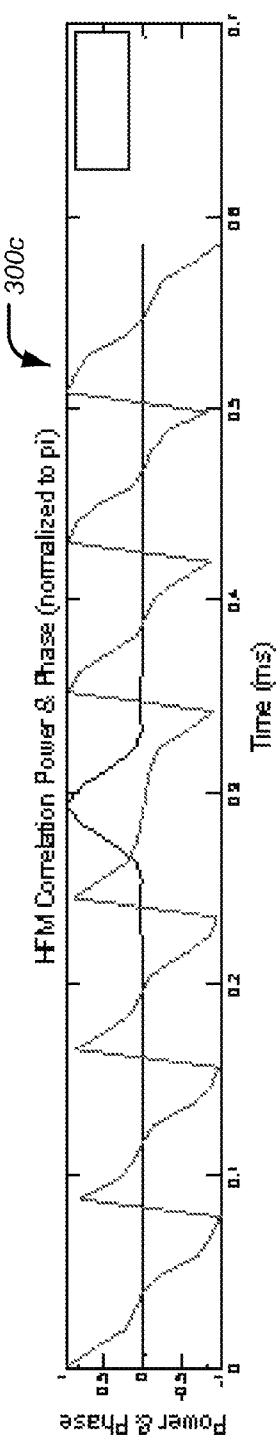
FIG. 8B illustrates one embodiment of a phase of a hyperbolic frequency modulated chirp signal compared to an autocorrelation of the hyperbolic frequency modulated chirp signal.
Figure 8C:
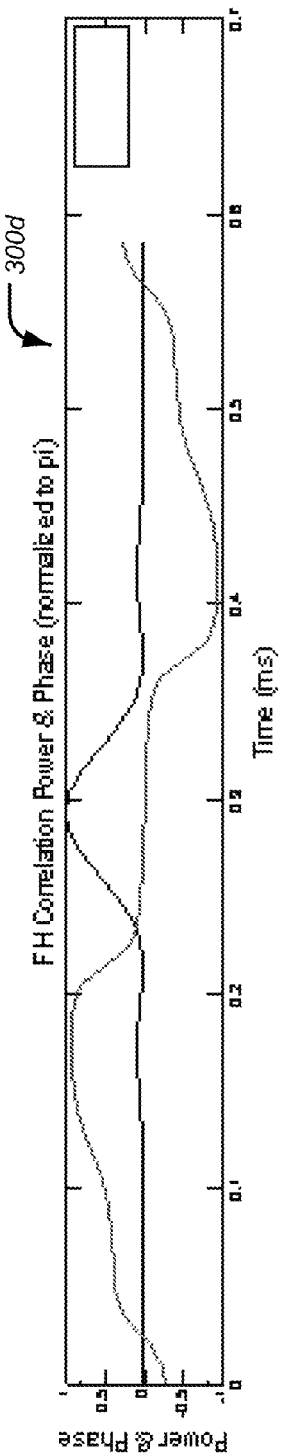
FIG. 8C illustrates one embodiment of a phase of a pseudo-random frequency hopping signal compared to an autocorrelation of the pseudo-random frequency hopping signal.

FIGS. 8A-8C show graphs 300b, 300c, 300d of signal phase plotted relative to the autocorrelation function for three distinct waveforms: a linear frequency modulated (LFM) signal shown in FIG. 8A, a hyperbolic frequency modulated (HFM) signal shown in FIG. 8B, and a pseudo-random frequency hopping signal shown in FIG. 8C. As can be seen in FIGS. 8A-8C, the phase of each of the distinct signals is constant (or nearly constant) under the main lobe of the autocorrelation function. The waveforms shown in FIGS. 8A-8C offer further support for the assumptions present in the process 200 for determining a direction of arrival.

Figure 9:
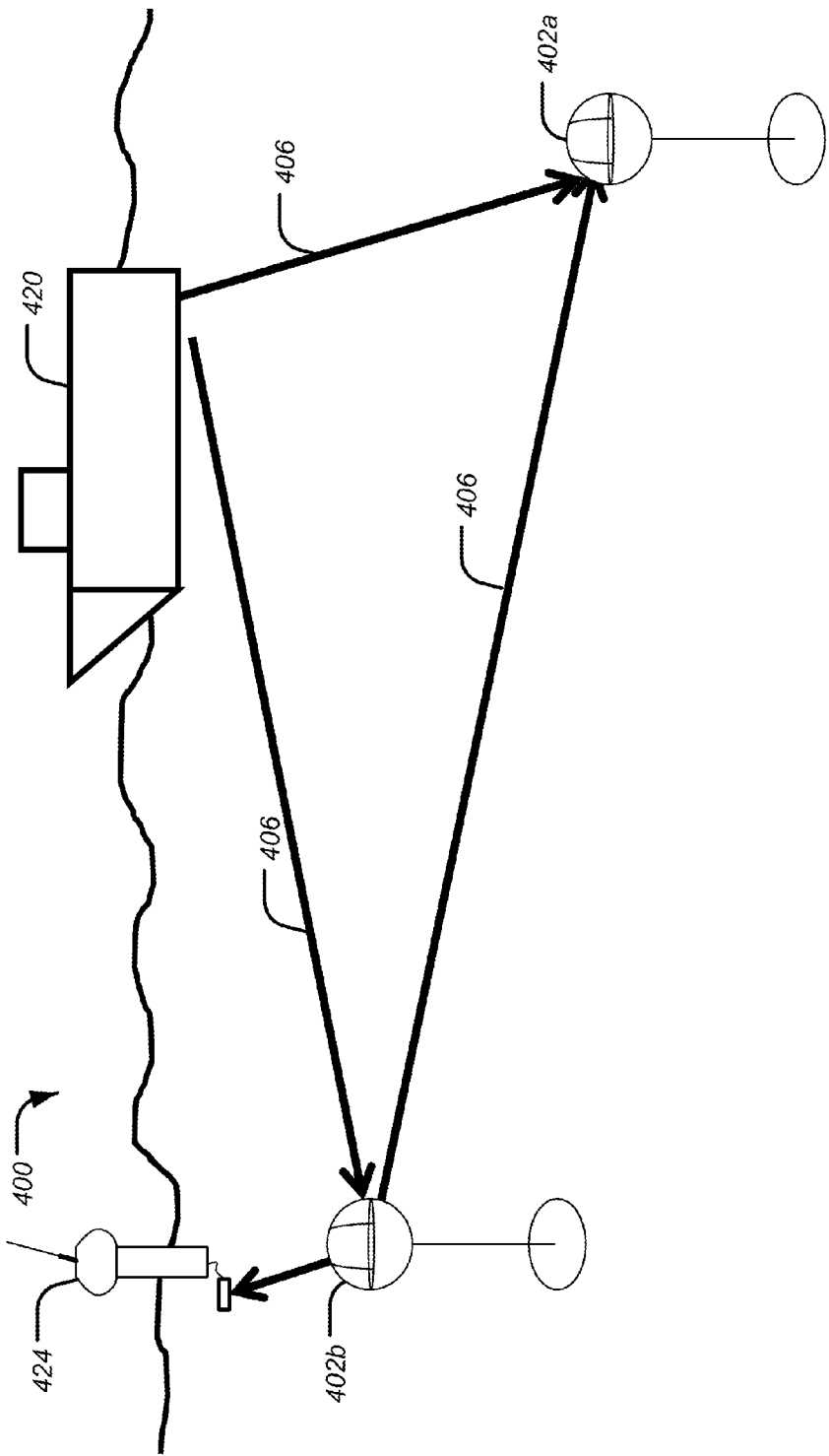
FIG. 9 illustrates one embodiment of bearing detection system comprising a plurality of passive bearing detectors.

FIG. 9 illustrates one embodiment of a multiple passive bearing detector system 400. The multiple passive bearing detector system 400 comprises a plurality of passive bearing detectors 402a, 402b. Each of the plurality of passive bearing detectors 402a, 402b is configured to determine a direction of arrival for an unknown broadband acoustic signal 406 received at each of the plurality of passive bearing detectors 402a, 402b. The plurality of passive bearing detectors 402a, 402b may each comprise a plurality of hydrophones in a geometric configuration, such as, for example, the four-hydrophone tetrahedral configuration shown in FIG. 2. An unknown broadband acoustic signal 406 is generated by a sea-going platform 420, such as, for example, a surface ship or a submersible. Each of the passive bearing detectors 402a, 402b may generate one or more directions of arrival for the unknown broadband acoustic signal 406, such as, for example, an azimuthal (or horizontal) direction of arrival and a vertical direction of arrival. The one or more directions of arrival calculated by the passive bearing detector 402a, 402b may be transmitted to a communication buoy 424.

In some embodiments, each of the passive bearing detectors 402a, 402b may comprise a transmitter, such as, for example, an acoustic modem, for transmitting a message comprising the one or more directions of arrival calculated by the passive bearing detector 402a, 402b. The multiple passive bearing detector system 400 may be configured for autonomously coordinated observation among the distributed multiple passive bearing detectors 402a, 402b. For example, in some embodiments, a first passive bearing detector 402a may transmit one or more directions of arrival calculated by the first passive bearing detector 402a to a second passive bearing detector 402b using acoustic communication. The second passive bearing detector 402b may receive the one or more directions of arrival calculated by the first passive bearing detector 402a. The second passive bearing detector 402b may transmit the one or more directions of arrival calculated by the first passive bearing detector 402a and one or more directions of arrival calculated by the second passive bearing detector 402b to a communications buoy 424. The communications buoy 424 may receive the one or more directions of arrival and may transmit the received information to a remote location, such as, for example, a land-based or ship-based monitoring station.

In some embodiments, a distributed passive bearing detector, such as passive bearing detector 2 or multiple passive bearing detector system 400 may be used to track one or more sea-going platforms, such as, for example, surface, near-surface, or sub-surface vessels. For example, tracking of sea-going platforms may be required in military operations, anti-smuggling operations, anti-piracy operations, or marine preservation operations. In one embodiment, the multiple passive bearing detector system 400 may provide autonomously coordinated observation among the distributed multiple passive bearing detector system 400. For example, in one embodiment, a sea-going platform, such as, for example, a ship 420, may radiate one or more unknown broadband acoustic signals 406. The unknown broadband acoustic signal 406 may be received by a first passive bearing detector 402a. The first passive bearing detector 402a may comprise a plurality of hydrophones arranged in a three-dimensional geometric configuration, such as, for example, the tetrahedral configuration shown in FIG. 2. The first passive bearing detector 402a may comprise a processor configured to determine at least one direction of arrival at one or more of the hydrophones. For example, the first passive bearing detector 402a may be configured to determine an azimuthal (or horizontal) direction of arrival and a vertical direction of arrival for the unknown broadband acoustic signal 406 at each of the hydrophones in the geometric configuration. The first passive bearing detector 402a may be configured to determine an average azimuthal and vertical direction of arrival for the unknown broadband acoustic signal 406 at the first passive bearing detector 402a. The first passive bearing detector 402a may comprise a transmitter configured to transmit a message comprising the at least one direction of arrival determined by the first passive bearing detector 402a to a second passive bearing detector 402b.

In some embodiments, the second passive bearing detector 402b may comprise a plurality of hydrophones arranged in a three-dimensional geometric configuration, such as, for example, the tetrahedral configuration shown in FIG. 2. The second passive bearing detector 402a may receive the unknown broadband acoustic signal 406 at each of the hydrophones. The second passive bearing detector 402b may comprise a processor configured to determine at least one direction of arrival at one or more of the hydrophones of the second passive bearing detector 402b. For example, the second passive bearing detector 402b may be configured to determine an azimuthal (or horizontal) direction of arrival ad a vertical direction of arrival for the unknown broadband acoustic signal 406 at each of the hydrophones of the second passive bearing detector 402b. The second passive bearing detector may comprise a transceiver, such as, for example, an acoustic modem, configured to send and receive acoustic signals.

In some embodiments, the first passive bearing detector 402a may transmit the one or more directions of arrival calculated by the first passive bearing detector 402a to the second passive bearing detector 402b, for example, through acoustic communication. The second passive bearing detector 402b may transmit the one or more directions of arrival calculated at the first passive bearing detector 402a and the one or more directions of arrival calculated by the second passive bearing detector 402b to a remote location, such as, for example, a communication buoy 424. The second passive bearing detector 402b may be in signal communication with the communication buoy, for example, through acoustic communication. The communication buoy 424 may transmit the received directions of arrival to a remote monitoring station, such as a land-based or ship-based monitoring station. The monitoring station may use the received directions of arrival of the unknown broadband acoustic signal 406 to calculate the position of the sea-going platform 420. Based on the calculated position, the monitoring station may dispatch sea-going platforms to intercept the sea-going platform 420 or to aim munitions at the sea-going platform, for example.

In some embodiments, a passive bearing detector is disclosed. The passive bearing detector may comprise a plurality of hydrophones arranged in a three-dimensional geometry configured to expose each of the plurality of hydrophones to an ambient aquatic acoustic environment. The passive bearing detector may further comprise a processor electrically coupled to the plurality of hydrophones. The processor may be configured to determine at least one direction of arrival of an unknown broadband acoustic signal received by the plurality of hydrophones based on the phase difference of the unknown broadband acoustic signal at each of the plurality of hydrophones. In some embodiments, the plurality of hydrophones may be equally spaced.

In some embodiments, the processor may be configured to determine the at least one direction of arrival, $\Theta_k$, of the unknown broadband acoustic signal at one pair of the plurality of hydrophones in accordance with the following relationship:

$$\Theta_k = \cos^{-1}\left(\frac{\lambda \Phi_k}{2\pi d_k}\right)$$

wherein $\lambda$ is the wavelength of the upper edge of the frequency band of the unknown broadband acoustic signal, k is a reference hydrophone selected from the plurality of hydrophones, $\Phi_k$ is the phase angle arising from a cross-correlation of the unknown broadband acoustic signal between the reference hydrophone and each one of the remaining plurality of hydrophones, and $d_k$ is the distance between each of the plurality of hydrophones.

In some embodiments, the processor may be configured to determine the at least one direction of arrival of the unknown broadband acoustic signal at each pair of the plurality of hydrophones. The passive bearing detector may comprise a transmitter configured to generate a message comprising the at least one direction of arrival calculated by the processor. The transmitter may be configured to transmit the message to a remote device. The transmitter may comprise an acoustic modem. The acoustic modem may provide acoustic communication to one or more additional passive bearing detectors and one or more associated undersea or near-surface sensors.

In various embodiments, a method for passive bearing tracking of sea-going platforms is disclosed. The method may comprise arranging a first plurality of hydrophones in a three-dimensional geometry configured to expose each of the plurality of hydrophones to an aquatic ambient acoustic environment. The first plurality of hydrophones may receive an unknown broadband acoustic signal. A first processor may be configured to calculate at least one first direction of arrival of the unknown broadband acoustic signal. The calculation is based on a phase difference of the unknown broadband acoustic signal received by the plurality of hydrophones. In some embodiments, the first plurality of hydrophones is arranged in an equally-spaced three-dimensional geometry.

In some embodiments, the first processor may be configured to calculate the at least one first direction of arrival of the unknown broadband acoustic signal, $\Theta_k$, in according with the following relationship:

$$\Theta_k = \cos^{-1}\left(\frac{\lambda \Phi_k}{2\pi d_k}\right)$$

wherein $\lambda$ is the wavelength of the upper edge of the frequency band of the unknown broadband acoustic signal, k is a reference hydrophone selected from the plurality of hydrophones, $\Phi_k$ is the phase angle arising from a cross-correlation of the unknown broadband acoustic signal between the reference hydrophone and each one of the remaining plurality of hydrophones, and $d_k$ is the distance between each of the plurality of hydrophones. In some embodiments, the method for passive bearing detection may comprise generating, by the first processor, a first message indicative of the at least one first direction of arrival of the unknown broadband acoustic signal. A first transmitter, such as, for example, an acoustic modem, may transmit the first message indicative of the at least one first direction of arrival of the unknown broadband acoustic signal through acoustic communication.

In some embodiments, a second plurality of hydrophones may be arranged in a three-dimensional configuration configured to expose each of the plurality of hydrophones to an ambient aquatic acoustic environment. The second plurality of hydrophones may be spaced apart from the plurality of hydrophones. The second plurality of hydrophones may receive the unknown broadband acoustic signal. A second processor coupled to the second plurality of hydrophones may calculate at least one second direction of arrival for the unknown broadband acoustic signal at the second plurality of hydrophones. In some embodiments, the second processor may generate a second message indicative of the at least one second direction of arrival for the unknown broadband acoustic signal. A second transmitter may transmit the second message indicative of the at least one second direction of arrival to a remote location. The second transmitter may transmit the second message indicative of the at least one second direction of arrival using acoustic communications. In some embodiments, a remote location may calculate the position of a sea-going platform using the first message and the second message In various embodiments, an apparatus for passive direction of arrival estimation of sea-going platforms is disclosed. The apparatus may comprise a plurality of hydrophones arranged in a three-dimensional geometry configured to expose each of the plurality of hydrophones to an ambient aquatic acoustic environment. The apparatus may further comprise a processor electrically coupled to the plurality of hydrophones and a memory unit coupled to the processor. The memory unit may be configured to store a plurality of instructions which when loaded by the processor control the processor to determine at least one direction of arrival of an unknown broadband acoustic signal received by the plurality of hydrophones based on a phase difference of the unknown broadband acoustic signal received by the plurality of hydrophones. In some embodiments, the plurality of hydrophones may be equally spaced.

In some embodiments, the plurality of instructions may control the processor to determine the at least one direction of arrival of the unknown broadband acoustic signal by calculating:

$$\Theta_k = \cos^{-1}\left(\frac{\lambda \Phi_k}{2\pi d_k}\right)$$

wherein $\lambda$ is the wavelength of the upper edge of the frequency band of the unknown broadband acoustic signal, k is a reference hydrophone selected from the plurality of hydrophones, $\Phi_k$ is the phase angle arising from a cross-correlation of the unknown broadband acoustic signal between the reference hydrophone and each one of the remaining plurality of hydrophones, and $d_k$ is the distance between each of the plurality of hydrophones.

In some embodiments, the apparatus for passive direction of arrival estimation may comprise a transmitter. The transmitter may be configured to generate a message comprising the at least one direction of arrival. The transmitter may be configured to transmit the message a remote device. In some embodiments, the transmitter may comprise an acoustic modem. The acoustic modem may provide acoustic communications to one or more additional passive bearing detectors and one or more associated undersea or near-surface sensors.

While various details have been set forth in the foregoing description, it will be appreciated that the various aspects of the systems and method for passive bearing detection may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a processor, or similar electronic computing device, that manipulates and transforms data represented as physical (electronic) quantities within the system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for implementing computer-implemented passive bearing detection, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. A passive bearing detector comprising:
a plurality of hydrophones arranged in a three-dimensional geometry configured to expose each of the plurality of hydrophones to an ambient aquatic acoustic environment;
a processor electrically coupled to the plurality of hydrophones, wherein the processor is configured to determine at least one direction of arrival of an unknown broadband acoustic signal received by the plurality of hydrophones based on the phase difference of the unknown broadband acoustic signal at each of the plurality of hydrophones, wherein the processor is configured to determine the at least one direction of arrival, $\Theta_k$, of the unknown broadband acoustic signal at one pair of the plurality of hydrophones in accordance with the following relationship:

$$\Theta_k = \cos^{-1}\left(\frac{\lambda \Phi_k}{2\pi d_k}\right)$$

wherein $\lambda$ is the wavelength of the upper edge of the frequency band of the unknown broadband acoustic signal, $\phi_k$ is the phase angle arising from a cross-correlation of the unknown broadband acoustic signal between the reference hydrophone and each one of the remaining plurality of hydrophones, and $d_k$ is the distance between each of the plurality of hydrophones.

2. The passive bearing detector of claim 1, wherein the plurality of hydrophones are arbitrarily spaced.

3. The passive bearing detector of claim 1, wherein the plurality of hydrophones are equally spaced.

4. The passive bearing detector of claim 1, wherein the processor is configured to determine the at least one direction of arrival of the unknown broadband acoustic signal at each pair of the plurality of hydrophones.

5. The passive bearing detector of claim 1, comprising a transmitter, wherein the transmitter is configured to generate a message comprising the at least one direction of arrival, and wherein the transmitter is configured to transmit the message to a remote device.

6. The passive bearing detector of claim 5, wherein the transmitter comprises an acoustic modem.

7. The passive bearing detector of claim 6, wherein the acoustic modem provides acoustic communications to one or more additional passive bearing detectors and one or more associated undersea or near-surface sensors.

8. A method for passive bearing tracking of sea-going platforms, the method comprising:
arranging a plurality of hydrophones in a three-dimensional geometry configured to expose each of the plurality of hydrophones to an aquatic ambient acoustic environment;
receiving, by the plurality of hydrophones, an unknown broadband acoustic signal;
calculating, by a processor, at least one direction of arrival of the unknown broadband acoustic signal, wherein the calculation is based on a phase difference of the unknown broadband acoustic signal received by the plurality of hydrophones, wherein the processor is configured to determine the at least one direction of arrival, $\Theta_k$, of the unknown broadband acoustic signal at one pair of the plurality of hydrophones in accordance with the following relationship:

$$\Theta_k = \cos^{-1}\left(\frac{\lambda \Phi_k}{2\pi d_k}\right)$$

wherein $\lambda$ is the wavelength of the upper edge of the frequency band of the unknown broadband acoustic signal, $\phi_k$ is the phase angle arising from a cross-correlation of the unknown broadband acoustic signal between the reference hydrophone and each one of the remaining plurality of hydrophones, and $d_k$ is the distance between each of the plurality of hydrophones.

9. The method of claim 8, wherein the plurality of hydrophones are arranged in an arbitrarily spaced three-dimensional geometry.

10. The method of claim 8, wherein the plurality of hydrophones are arranged in an equally spaced three-dimensional geometry.

11. The method of claim 8, comprising:
generating, by the processor, a signal indicative of the at least one direction of arrival of the unknown broadband acoustic signal; and
transmitting, by an acoustic transmitter, the signal indicative of the at least one direction of arrival of the unknown broadband acoustic signal through acoustic communication.

12. The method of claim 11, comprising:
arranging a second plurality of hydrophones in a three-dimensional configuration configured to expose each of the plurality of hydrophones to an ambient aquatic acoustic environment, wherein the second plurality of hydrophones are spaced apart from the plurality of hydrophones;
receiving, by the second plurality of hydrophones, the unknown broadband acoustic signal; and
calculating, by a second processor, at least one second direction of arrival for the unknown broadband acoustic signal at the second plurality of hydrophones.

13. The method of claim 12, comprising:
generating, by the second processor, a signal indicative of the at least one second direction of arrival for the unknown broadband acoustic signal;
transmitting; by a second acoustic transmitter, the signal indicative of the at least one second direction of arrival to a remote location, wherein the second transmitter transmits the signal indicative of the at least one second direction of arrival using acoustic communications.

14. The method of claim 13, comprising:
calculating, by the remote location, a position of a sea-going platform using the signal indicative of the at least one direction of arrival and the signal indicative of the at least one second direction of arrival.

15. An apparatus for passive direction of arrival estimation of sea-going platforms, the apparatus comprising:
a plurality of hydrophones arranged in a three-dimensional geometry configured to expose each of the plurality of hydrophones to an ambient aquatic acoustic environment;
a processor electrically coupled to the plurality of hydrophones; and
a memory unit coupled to the processor, the memory unit configured to store a plurality of instructions which when loaded by the processor control the processor to:
determine at least one direction of arrival of an unknown broadband acoustic signal received by the plurality of hydrophones based on a phase difference of the unknown broadband acoustic signal received by the plurality of hydrophones, wherein the processor is configured to determine the at least one direction of arrival, $\Theta_k$, of the unknown broadband acoustic signal at one pair of the plurality of hydrophones in accordance with the following relationship:

$$\Theta_k = \cos^{-1}\left(\frac{\lambda \Phi_k}{2\pi d_k}\right)$$

wherein $\lambda$ is the wavelength of the upper edge of the frequency band of the unknown broadband acoustic signal, $\phi_k$ is the phase angle arising from a cross-correlation of the unknown broadband acoustic signal between the reference hydrophone and each one of the remaining plurality of hydrophones, and $d_k$ is the distance between each of the plurality of hydrophones.

16. The passive bearing detector of claim 15, wherein the plurality of hydrophones are equally spaced.

17. The passive bearing detector of claim 15, comprising an acoustic transceiver, wherein the acoustic transceiver is configured to generate a message comprising the at least one direction of arrival, wherein the acoustic transceiver is configured to transmit the message to a remote device using acoustic communication.

* * * * *